ELECTRONICALLY SUSTAINED CLOCKWORK MECHANISM

Filed Aug. 7, 1967 4 Sheets-Sheet 1

ELECTRONICALLY SUSTAINED CLOCKWORK MECHANISM

Filed Aug. 7, 1967 4 Sheets-Sheet 2

United States Patent Office 3,465,511
Patented Sept. 9, 1969

3,465,511
ELECTRONICALLY SUSTAINED CLOCKWORK MECHANISM

Serge Simon Held, 31 Rue de Chazelles, Paris 17eme, France

Filed Aug. 7, 1967, Ser. No. 658,696
Int. Cl. G04c 3/04
U.S. Cl. 58—28 14 Claims

ABSTRACT OF THE DISCLOSURE

This invention broadly relates to clockwork mechanisms driven by a balance wheel, the oscillation of which is maintained by the reactions produced between magnets and flat coils as they perform relative angular displacements.

The instant invention more particularly relates to a clockwork mechanism wherein the balance wheel is unresponsive even to the close proximity of iron masses or ambient fields.

This invention relates to a clockwork mechanism which is driven by a balance wheel, the oscillations of which are maintained by the reactions produced between magnets and flat coils as they perform relative angular displacements. The mechanism is supplied with power through a transistor amplifier which causes the closure of the supply circuit in the drive winding each time the balance wheel passes through its position of equilibrium.

The electronic maintenance of a regulating balance wheel comprising integral magnets which produce an electromagnetic force in an induced coil inserted in the input circuit of an amplifier, the output circuit of which supplies a driving reaction winding on the same magnet, has priorly been disclosed.

The principle of utilization of the semiconductor junction was also priorly known.

By virtue of the circuit arrangements described in the patent cited, the supply of current to the output circuit can be continuously cut off and reestablished only when a voltage tending to generate a current in the conductive direction of the semiconductors is applied to the input circuit, which takes place when the balance wheel passes through its position of static equilibrium.

The utilization in this kind of clockwork mechanism of flat coils of triangular configuration having two active sides aligned with two radii of the balance wheel and adapted to cooperate with magnets having triangular poles has been also priorly described.

A number of different devices for directing magnetic flux and protecting magnets are priorly known.

The above mentioned prior devices are subject to a number of drawbacks which this invention is intended to circumvent.

Accordingly, an object of the invention is to provide a clockwork mechanism of the type referred to in the foregoing, wherein the balance wheel is unresponsive even to the close proximity of iron masses or of ambient fields which would otherwise be liable to disturb the isochronism, said mechanism being constituted for this purpose by a frame of very thin sheet which is fabricated from a hypermagnetic alloy and designed to concentrate the flux within either one or two air gaps while forming a protective shielding around the magnets without in any way affecting the shape, amplitude and phase of the electromotive forces and couples exerted on the induced coil and drive coil, the balance wheel being intended to behave from this point of view as if the shielding did not exist.

A further object of the invention is to provide a sturdy and highly economic form of construction of the balance wheel frame wherein said frame in wholly produced by profile cutting from a very thin sheet of magnetic alloy of which certain portions are then suitably folded back or cambered so that one portion closes the flux in a short circuit within the coils and another portion which has the shape of a flexible bracelet serves as a screen and can both grip and maintain a premagnetized body without any variation, the pivot pin being adapted to pass through the sheet metal frame at two points, thereby providing the assembly with a high degree of rigidity and non-deformability.

Another object of the invention is to provide a balance wheel frame of the type aforesaid which is so constructed as to permit of immediate removal of a standard coerceive block having a variable number of poles formed in the mass, said block being introduced within two flexible arms of the frame and held in position without bonding so as to permit of easy removal, thereby making it possible to adopt a single type of balance wheel for different applications of clockwork mechanisms which utilize either one, two or three poles.

Yet another object of the invention is to provide a balance wheel frame which is so designed as to permit the suppression of the sheet-iron plate which usually provides a coupling between the inactive poles of magnets in the conventional construction of this type of balance wheel, the flux being closed within the air-gap without passing through a magnetic sheath which surrounds the pivot pin even if use is made of a single flux path and a single magnet, which would prove impossible in the case of known forms of construction of balance wheels of this type.

A further object of the invention is to provide a mode of construction of the clockwork mechanism of the aforesaid type for the purpose of enhancing both the accuracy and efficiency of the mechanism and improving the conditions of operation of an inexpensive transistor of the usual type by reducing the unfavourable influence of temperature and of variations in supply voltage, this result being obtained on the one hand by means of a particular arrangement of drive coils and induced coils and on the other hand by means of a particular mode of supply of a highly coercitive material as a result of the shape and distribution of the pole surfaces and the position of the zones of emergence of the magnetic flux in air with respect the screen-bracelet which surrounds the coercitive body.

Yet a further object of the invention is to suppress the spurious high-frequency oscillations which are established in the amplifier systems when the output circuit (drive coil) induces the input circuit (receiving coil) by means of an electrodynamic screen which may be either movable or stationary and which does not brake the magnets of the balance wheel.

These and other objects of the invention, together with the advantages thereof, will become readily apparent from the following description, reference being made to the accompanying drawings, in which:

FIGURES 1*a* to 1*c* show a first embodiment of the frame of a balance-wheel obtained by cutting a sheet (FIGURE 1*a*) of magnetic alloy, portions of which are folded and cambered so as to provide the shape as shown in plan in FIGURE 1*b* and in perspective in FIGURE 1*c*.

FIGURE 1*d* (plan view) and FIGURE 1*c* (profile of the cut sheet) illustrate a modification.

FIGURES 2*a* and 2*b* illustrate, in section and as a profile of the cut sheet, respectively, an improved embodiment wherein the plate which closes the magnetic flux circuit is obtained by cutting a single sheet which also forms the frame of the balance wheel.

FIGURES 3 and 4 show modifications of the devices illustrated in FIGURES 2*a* to 2*c*.

FIGURES 5*a* to 7*b* illustrate a coercive block magnetized in a lateral-axial mode, which enables one to suppress the plate which normally short-circuits the inactive poles of the magnets.

FIGURES 8*a*, 8*b*, 8*c*, show how the coils may be maintained by a lateral plane support, instead of being fixed axially, through throwing off the pivoting axis.

Figures 5A, 5B, 6, 7A, 7B, 8A, 8B, 8C, 9, 10, 11, 12, 13, 14, 15, 16A, 16B:
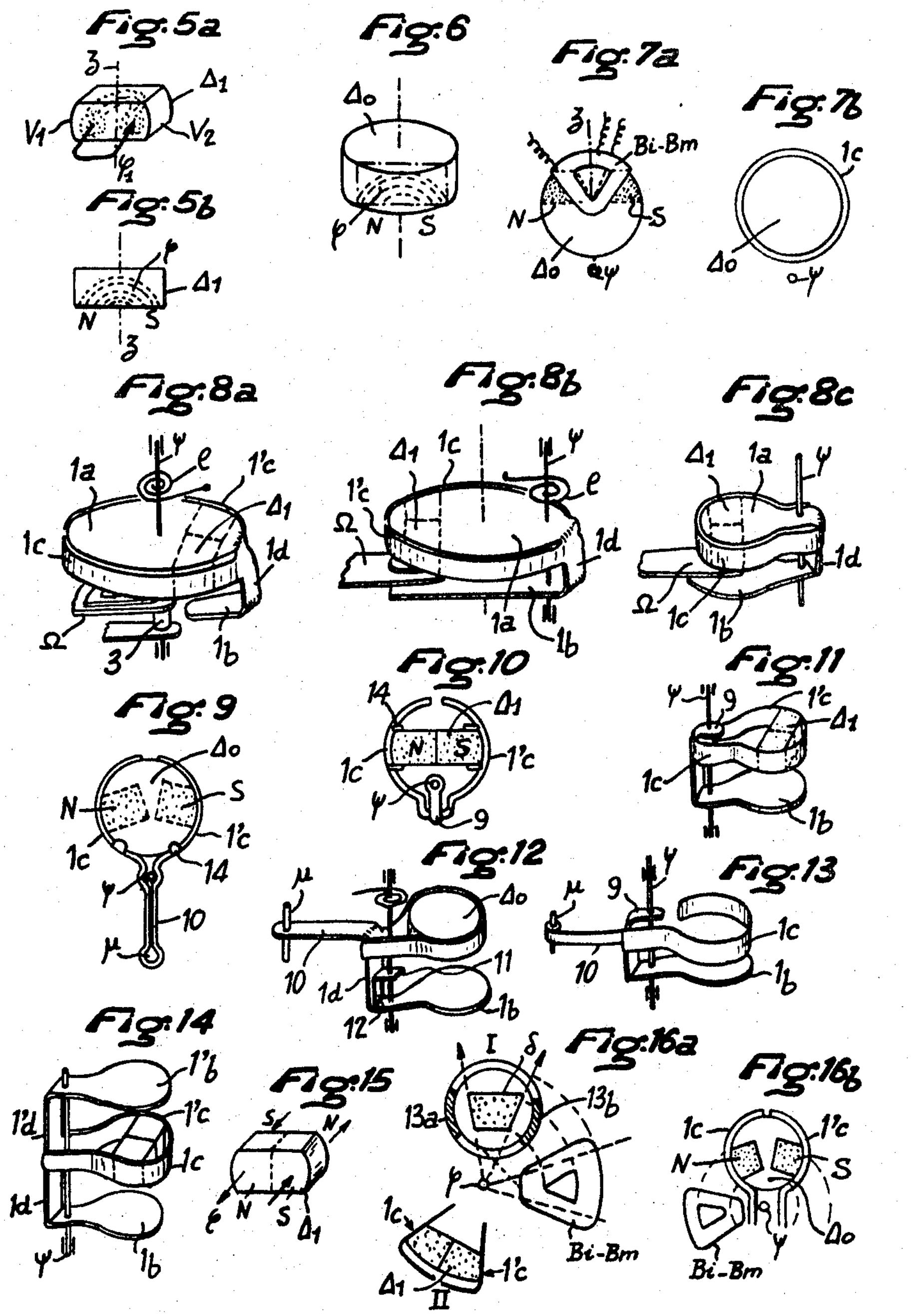
FIGURES 9 to 13 show modifications of FIGURE 8*c* which permit the use of a magnetized body in accordance with FIGURES 5*a* to 7*b*.
FIGURE 14 shows a balance wheel which is fitted with an axially magnetized bipolar magnet, both faces of which are active, as illustrated in FIGURE 15.

FIGURES 16*a* and 16*b* illustrate the features and advantages of a magnetic screen in accordance with the invention.

Figures 1A, 1B, 1C, 1D, 1E, 2A, 2B, 2C, 3, 4, 17:
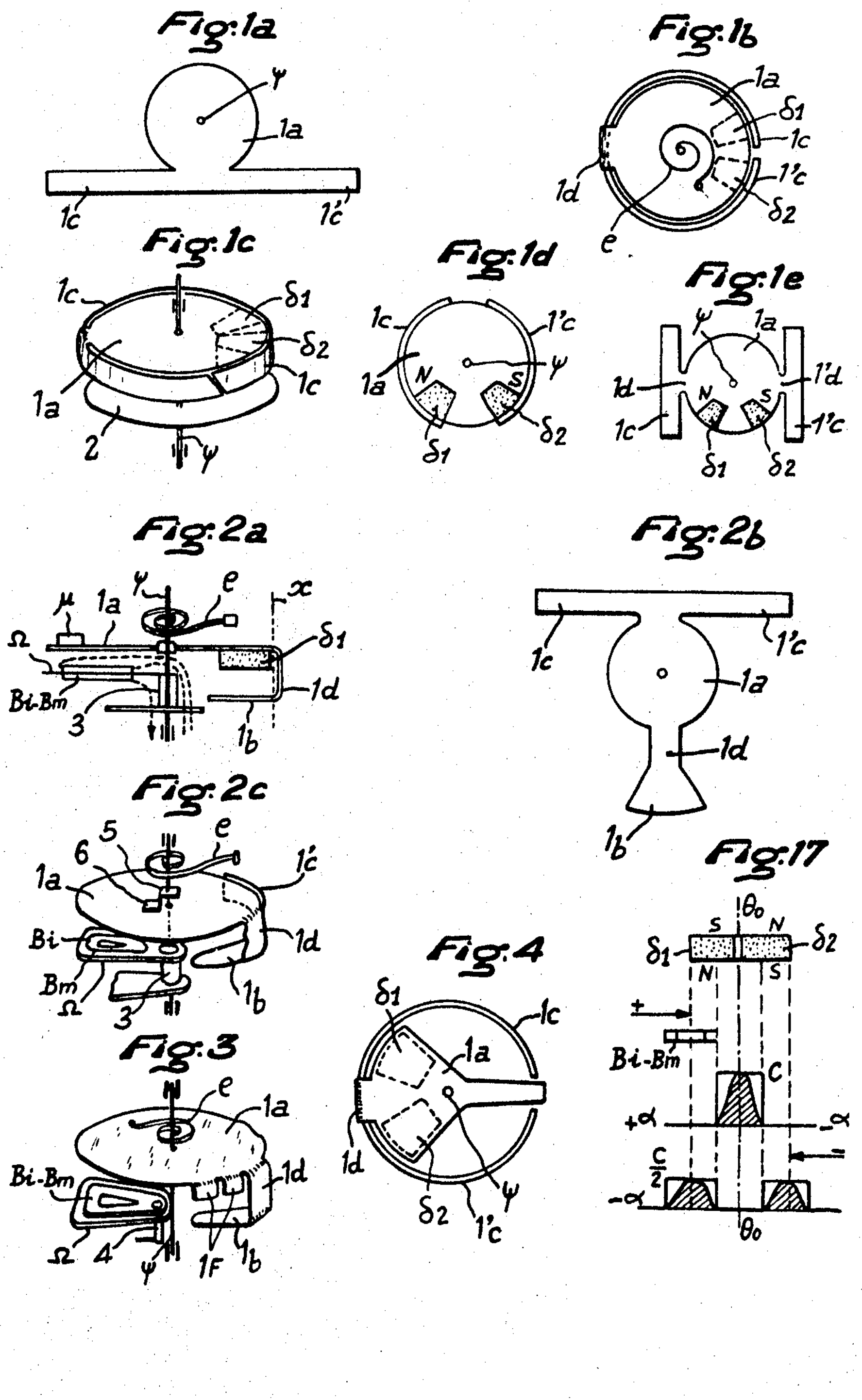

FIGURE 17 shows, as a function of time and elongation, the theoretical-diagrams of the couples in a conventional device including two juxtapose polar pieces and two coaxial coils.

Figures 18, 19, 20A, 20B, 20C, 21, 22, 23A, 23B, 24A, 24B, 24C, 25, 26, 27:
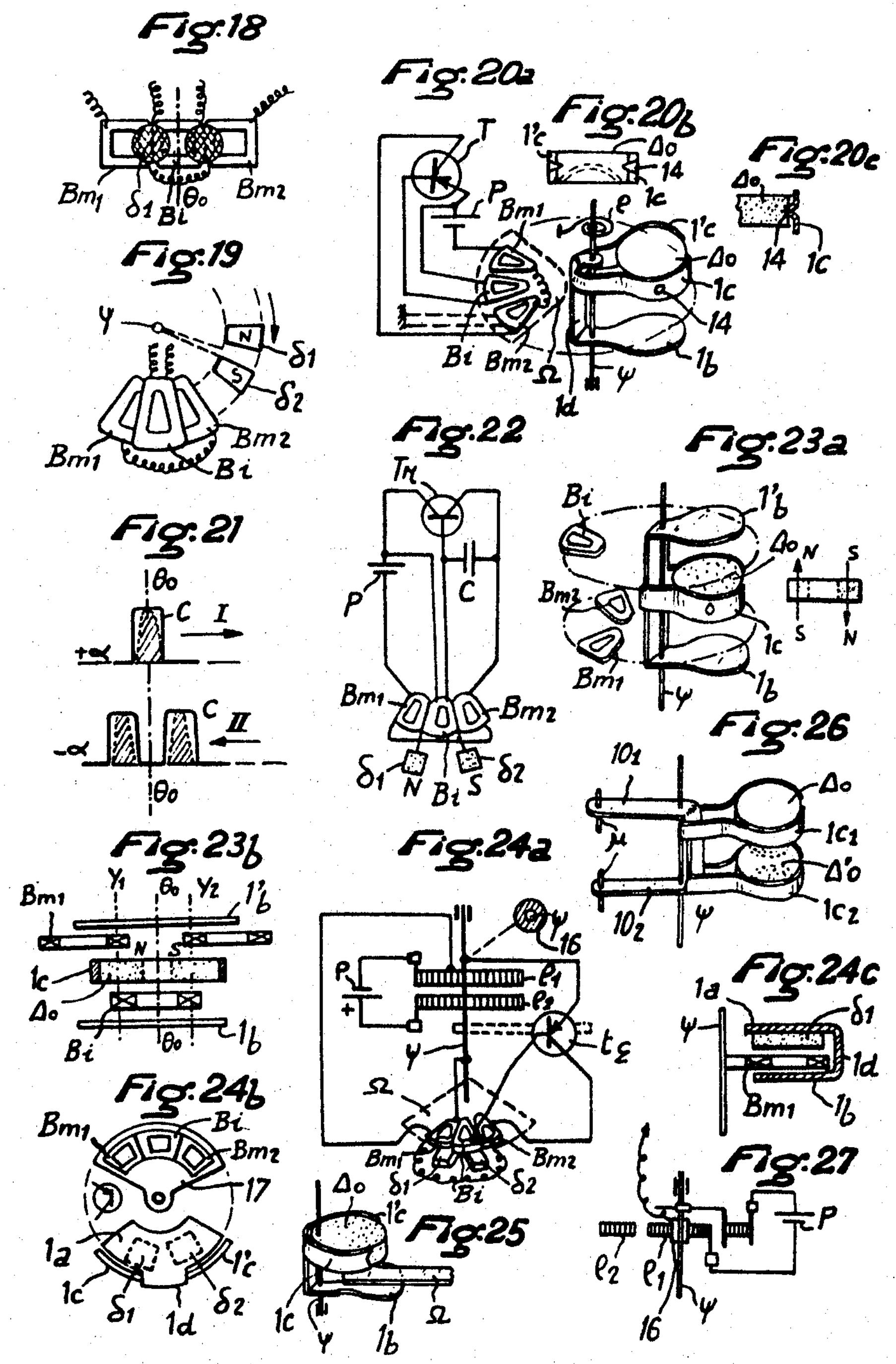

FIGURES 18, 19 and 22 show an embodiment including an induced coil which cooperates with two drive coils, the three coils being juxtaposed in the same plan, and FIGURE 21 illustrates the operation of the said embodiment.

FIGURES 20*a*, 20*b* and 20*c* show an embodiment of a balance wheel in accordance with the design illustrated in FIGURES 9, 12 and 13, and including three coils and a cylindrical magnet having two poles localized in a circular face.

FIGURES 23*a* and 23*b* show a similar embodiment which includes a cylindrical magnetic body having two polar active faces, the device comprising four active poles and two air gaps.

FIGURE 26 shows a modification.

FIGURE 25 shows another modification, wherein the pivoting axis passes through the cylindrical magnetic body, said modfiication being adapted for manufacturing small-sized watches.

FIGURES 24*a*, 24*b*, 24*c*, 27 and 29 illustrate a balance wheel with movable coils and stationary magnets.

Figure 28A:
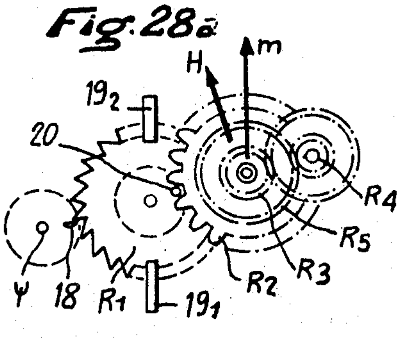
Figure 28B:
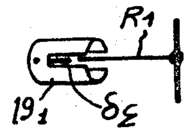

FIGURES 28*a* and 28*b* show the mechanical components which drive the timing mechanism step by step.

Figure 30:
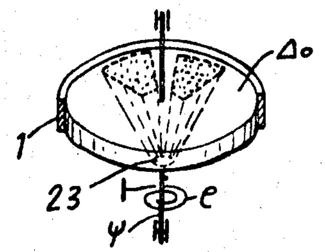
Figure 31:
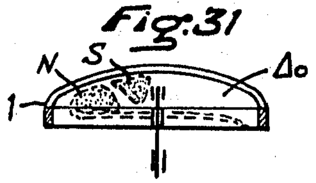
Figure 32:
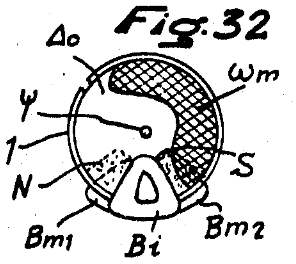

FIGURES 30, 31 and 32 illustrate magnetization modes and polar surfaces, shapes for a disc-shaped coercive body which forms a balance wheel in combination with copper plates and a screen and, FIGURES 30 to 35 illustrate the use of an electrodynamic screen provided for cancelling any parasiticoscillations.

In the figures:

$\delta$ designates a conventional ferrite magnet with axial magnetization;

$\gamma$ designates a counterweight;

$\Delta_1$ designates a rectangular coercive body which is provided in the mass with two localized poles with axial or lateral axial magnetization;

$\Delta_0$ designates a coercive body of cylindrical shape having two localized poles;

$\psi$ designates the pivotal axis or pivot pin of the balance wheel;

$B_m$ designates a drive coil;

$B_i$ designates an induced coil or receiving coil;

N–S designates the north and south poles of the magnets;

$\epsilon$ designates a balance wheel coil spring;

R designates the gear wheels;

$\omega_m$ designates a movable electrodynamic screen;

$\omega_F$ designates a stationary electrodynamic screen;

C designates a capacitor;

T designates a transistor;

P designates a dry cell.

Other elements are designated by reference numerals.

Different manufacturers have proposed to surround a balance wheel magnet by a soft-iron cylinder which is integral with the balance wheel.

The magnetic flux then closes, partly in the air gap and partly in the shielding. When the conductors of the winding pass through the air gap (as shown in FIGURE 16*a*), they are interesected, not only by the magnetic lines of force of the magnet but also by those which are closed in the screen, thus disturbing the electronic operation. In fact, the beginning and end of the signal which initiates the conductivity of the transistor and the driving forces no longer correspond to the pole surface of the magnet but to surfaces of the magnet and those of the induced poles in the screen.

It has been proposed to utilize for the purpose of producing the triggering signal and the driving forces both the pole of the permanent magnet and the induced poles located in small masses of soft iron which are suitably disposed in the vicinity of the magnet.

The torques obtained are then of lower value inasmuch as use is made only of a single magnet instead of two or three. It has also been proposed by the same inventor to surround a magnetic ceramic magnet having axial magnetization by a soft-iron sheath which closely adheres thereto and which magnetically short-circuits the peripheral edges of the two poles but which does not have any disturbing effect; however, the loss of magnetic energy due to shunting from pole to pole is of the order of 30%. If the axial height of the sheath is smaller than the distance between the two poles, the loss is reduced in proportion, but the magnet remains sensitive to external influences of undesirable orientation; the same applies if the nonpolar faces of the magnet are not all shunted by adherent plates of soft iron.

A first satisfactory design of a magnetic screen has priorly been proposed. This design is applicable only to cylindrical electromagnetic watches in which the coils are incurved and have surfaces parallel to the pivotal axis. A single sheet-iron ring which is concentric with the pivotal axis produces the closure of the pole fluxes and provides protection of the magnets. In the case of a flat watch in which the pole fluxes are parallel to the pivotal axis and the surfaces of the coils are perpendicular to said axis, the inactive poles of the magnets must be coupled by a small soft-iron plate, which usually makes it necessary to endow the screen with the shape of a casing which is closed on one side (i.e., a bell-type casing).

In point of fact, it is practically impossible to die-stamp a sheet of hypermagnetic alloy (alloyed metal, for example) for the purpose of forming a very thin "bell" without either cracks or other irregularities, with the result that "extra-flat" solutions cannot be achieved by this means.

The embodiments described hereinafter make it possible to circumvent the disadvantages mentioned in the foregoing.

FIGURES 1*a*, 1*b*, 1*c*, represent one form of construction of a balance wheel which reconcile the simplicity of an extra-lightweight shielding consisting of very thin magnetic strip (2/10 mm. for example) with the conditions imposed by a very flat mechanism.

The shielding referred to is designated by the references 1*c*–1*c′* and the adherent plate which adheres to the inactive poles of the magnets ($\delta_1$–$\delta_2$) by the reference 1*a*, the complete assembly being formed in one piece by cutting from a single sheet (as shown in FIGURE 1*a*) said sheet being of very small thickness and fabricated from a hypermagnetic alloy. Portions of the sheet are folded and cambered without thereby inducing any stresses which would be detrimental to a delicate and brittle alloy as would be the case if a sheet were press-forged in order to obtain a very thin-walled bell having a flat base. In the case of a small clock of normal dimensions, the frontal surfaces of the magnets (which are parallel to the axis of magnetization) do not touch the circular screen 1*c*–1*c′* (approximately 1 mm. of radial air gap). When, for reasons of overall size (e.g., a dashboard or facia-panel clock), it proves necessary to reduce the diameter of the casing to the maximum extent, the diameter of the screen which is correspondingly reduced is then in contact with the frontal faces of $\delta_1$ and $\delta_2$; and in order to reduce flux losses, the cutting profile is slightly modified as shown in FIGURE 1*e*. A balancewheel of this type is shown in plan in FIGURE 1*d*, looking on the side of the active poles.

In the accompanying figures, the need to mount the plate 2 on the pivot pin $\psi$ as shown in FIGURE 1*c* has been circumvented by forming a plate for closing the flux in a circuit of small length, said plate being formed in one piece with the balance wheel frame from the cutting profile shown in FIGURE 2*b*; the reference 1*d* designates the portion of the frame which is parallel to the rotational axis and the same references designate the same portions.

In conformity with the foregoing, the portion 1*d* can be in contact with the adjacent surface of the magnet (on the axis *x*) as shown in FIGURE 2*a* (in cross-section through the pivotal axis $\psi$).

FIGURE 2*c* is a view in perspective. It is apparent from this figure that, in order to permit of free rotation, the windings $B_1$–$B_m$ are attached to an axial support 3 which is located close to the pivotal axis, or pivot pin. Said pin is shown as being tubular in FIGURES 2*a* and 2*c* and has the shape of a small column 4 in the alternative form of FIGURE 3.

Inasmuch as it is at the periphery of the balance wheel and in the frontal region that the magnets are the most highly exposed to the influence of a magnetic body which is in close proximity, it does not serve any useful purpose to close circularly the arms 1*c*–1*c'* (at least in the case of any small clock or travelling clock under normal atmospheric conditions). The elbowed portion 1*d* and the two short concentric arms (of which one arm, namely the arm 1*c'*, is illustrated in FIGURE 2*c* whilst the other has been broken away) provide wholly adequate protection.

FIGURE 3 shows an alternative form in which the flanges of 1*c*–1*c'* are replaced by turned-down teeth $1_F$ which perform the same function.

The overhead view of FIGURE 4 shows a form of execution in which a circular shielding is provided in all azimuths.

FIGURE 2*c* illustrates the use of a small bracket 5 for the purpose of reinforcing the maintenance of the plate 1*a* on the pivot pin, said bracket being formed by cutting a window in the plate 1*a* by means of the tool employed for cutting out the entire frame.

It has been observed that, in practice, the fixation of a very thin metallic plate on a pin of very small diameter is delicate and is detrimental to economic manufacture on a large scale, in the case of clocks fitted on vehicles which are subjected to vibrations or shocks, the plate 1*a* is liable to warp or become dislodged. As has been done in the embodiments shown in the figures, it is wholly preferable to secure the balance wheel at two points of the pin, thereby endowing the complete assembly with a high degree of rigidity.

The structures of the magnetic frame which have been described in the foregoing can comprise either one, two or three magnets which are constructed in any suitable manner and any suitable arrangements of the induced coil $B_1$ and drive coil $B_m$.

However, there will be given hereinafter preferred forms of construction of magnets and coils which are adapted to cooperate with the shape of the magnetic frame in order to produce the best results.

In particular, instead of employing two separate magnets of the axial magnetization type as has been shown in FIGURES 1 to 4, advantageous use has been made of a single block of coercive material having pole surfaces localized in the mass.

By way of nonlimitative example, there is shown in FIGURE 5*a* (in perspective), in FIGURE 5*b* (in transverse cross-section) a highly coercive body $\Delta_1$ which is limited by four plane rectangular surfaces and two rounded faces, magnetization being lateral-axial and two-pole on a single face, $\varphi$ representing the approximate path of the magnetic lines of force whilst Z represents the neutral path.

In FIGURE 6, the coercive body is a flat cylinder $\Delta_0$. The pole surfaces can have triangular, circular oval or square surfaces. By way of example, FIGURE 7*a* represents in the case of the coercive body $\Delta_0$ of FIGURE 6 the "active" circular face with two poles N–S having inductive and driving actions on the windings $B_1$–$B_m$ whilst FIGURE 7*b* shows the opposite nonmagnetized face which is magnetically neutral of the same coercive body $\Delta_0$.

It is also possible to utilize the forms of magnets of FIGURES 5*a*–5*b* and 6 with an axial magnetization, that is to say with two poles on each of the parallel plane faces. The choice of either one magnetization configuration or the other depends on the applications. In the case of a very flat watch having a magnet of very small thickness, it is preferable to have recourse to an anisotropic axial magnetization having high residual induction; in the case of small clocks, travelling clocks or automobile clocks, use will be made of a lateral-axial magnetization which is therefore isotropic (which calls for a slightly greater thickness).

The association of the above-mentioned forms of magnets with the balance wheel frame structure previously referred to makes it possible to improve both the conditions of protection with respect to external influences and the cost price compared with the conventional two-pole assembly comprising two separate magnets which are oriented radially and bonded to a magnetic plate. Bonding is a disadvantage since an accurate watch should be constructed solely of parts which are not subject to deterioration in the course of time.

The premagnetized coercive block hereinabove described is attached by means of small pins or lugs 14 (as shown in FIGURES 9 and 10). In lateral-axial or in axial double face magnetization, it is possible to disperse with with the plate 1*a* whereby the two inactive poles are coupled magnetically. The frame, which is the magnetic portion of the balance wheel, is in that case reduced to a sheet-metal bracelet or two-arm clamp which grips the magnetized body elastically, as shown in FIGURE 10 and following. In the case of a flat watch with flat coils located in the same plane as the dial, it is thus possible to provide an ideally simple and lightweight protective screen. The coercive block is removable and can be instantaneously adapted to a same balance wheel of the same shape but magnetized with a different number of poles.

It should be pointed out that a single magnet with lateral-axial magnetization $\Delta_1$–$\Delta_2$–$\Delta_0$ (FIGURE 5*a* and following) exhibits low scattering of magnetic lines of force over the nonpolar lateral surfaces $V_1$–$V_2$ (FIGURE 5*a*) which can in that case be in intimate contact with a soft-iron sheet without weakening the main flux to any appreciable extent: in other words, perfect protection by screen effect is achieved and the magnets produce action on the coils virtually as if they were bare.

FIGURE 8*a* is derived from FIGURES 2*a* to 4, except for the fact that the two separate magnets $\delta_1$–$\delta_2$ are replaced by a block $\Delta_1$ of the two-pole axial magnetization type or two-pole lateral-axial magnetization type. Free rotational motion calls for an axial coil support 8 in order that the elbow 1*d* should not come into abutment with the support.

In the case of very flat watches, it is preferably to ensure that the entire coil support is located in a plane at right angles to the axis, which is obtained by displacing the axis $\psi$ off-centre to a point very close to 1*d* and by placing the magnet at the other diametral end (as shown in FIGURE 8*b*). In this case, the balance wheel is no longer of revolution about the axis $\psi$. Under these conditions, it is possible to reduce the surface area 1*a* and to tighten the clamp 1*c*-1*c'* around the body $\Delta_1$ (as shown in FIGURE 8*c*). If said body $\Delta_1$ is of the lateral-axial magnetization type (as shown in FIGURES 5*a* to 7*b*), the plate 1*a* of FIGURE 8*c* serves no further purpose and there is in that case obtained the form of FIGURE 11, the simplicity of which cannot be improved upon.

FIGURE 10 is a plan view looking on the side of the pole surfaces and showing an alternative form of the support shielding in the case of a two-pole magnetized body.

FIGURE 12 represents the same type of frame but with an arm 10 which is formed in a single piece by cutting out and serves to provide the balance wheel with a counterweight $\mu$.

FIGURE 13 is a modification in which the clamping band 1*c* comprises only a single arm 1*c*.

FIGURE 14 illustrates the same mode of construction but with double-face utilization of a ferrite block which is understood to be magnetized axially and which is shown in FIGURE 15. Two poles are inductive with respect to a coil $B_i$ which is inserted in the base of the transistor, and the opposite poles are driving with respect to a coil $B_m$ which is inserted in the output circuit.

FIGURES 16*a* and 16*b* are intended to illustrate the advantages of the frame hereinabove described in the different modes of execution thereof:

In the top portion I of FIGURE 16*a*, the reference 13 designates a conventional annular shielding around a magnet $\delta$. When the screen reaches the coils $B_i$–$B_m$, the fluxes of the lateral portions 13*a*–13*b* (shaded portions) intersect the radial conductors of the coils and give rise to spurious phenomena. The frontal portions of the shielding (unshaded portions) pass along the conductors concentrically with the axis and consequently do not produce any action.

The frame which is described in reference to the previous figures is shown diagrammatically at II. The radial portions of the shielding are applied against the radial faces of a magnet $\Delta_1$ such as, for example, the magnet of FIGURE 5*a*: they therefore cannot give rise to a spurious signal prior to and after the passage of the pole surfaces and everything takes place as if the magnet were not provided with any shielding, with an insignificant loss of magnetic power by virtue of the fact that the surfaces 1*c*–1*c'* which adhere to the shielding are only two in number and the fact that, by reason of the properties of a coercive body of this type having lateral-axial magnetization, the magnetic lines of force which emerge from these surfaces into the air are relatively very weak. In the modes of execution which comprise two separate magnets, in order to obtain the same protection, it will be necessary to ensure that the shielding is applied against the four axial faces and therefore against eight faces instead of two.

FIGURE 16*b* shows the shape of the pole surfaces (by way of non-limitative example) in the case of a flat cylindrical body $\Delta_0$. The pole surfaces are adherent only on two radial sides to the shielding 1*c*–1*c'*.

There will now be described a preferred arrangement of the coils which, in conjunction with the balance wheel frame hereinabove described, makes it possible to develop sufficiently high electromotive forces to obtain saturation of the transistor in respect of either one alternation or the other.

The conventional arrangement consists in disposing a drive coil and an induced coil in superposed relation or with interlaced wires or double wires. Assuming that the wires have the same diameter, each coil occupies approximately one half the thickness of the entire coil unit.

In the case of a conventional two-pole flux distribution, FIGURE 1 shows that, in one direction, both sides of the coils are active whereas, in the opposite direction, only one of the two sides is active, thereby obtaining torques in a ratio of 1:½.

It has already been proposed to dispose a drive coil in juxtaposed relation with a receiving coil in the same plane in the presence of one or a number of magnets: in this manner, each coil can be given a greater thickness without increasing the air gap. Since it is practically impossible in the case of a transistor of ordinary type to obtain conduction of the output circuit in respect of an electromotive force having an amplitude E and the blocking of said circuit in respect of $E/2$, these circuit arrangements make it necessary in respect of a predetermined angular position and alternation to produce a current pulse without any driving torque, thereby resulting in a waste of the energy of the cell. The circuits hitherto proposed which give rise to this undesirable effect are as follows:

A drive coil $B_m$ and a receiving coil $B_i$ which are disposed side by side in a same plane in the presence of two magnetic poles N–S.

Two juxtaposed coils in the presence of three alternate poles: N–S–N or S–N–S.

Two juxtaposed coils $B_m$–$B_i$ in the presence of a N or S magnet pole.

In the case of three coils which are disposed in juxtaposed relation and one magnet pole (two series-connected drive coils and one central receiving coil), the above-mentioned defects are avoided but the efficiency is very low by reason of the fact that, in all positions, only one side of the two drive coils produces action. In other words, three sides are always inactive at the moment of transition through the equilibrium position in both directions.

By disposing symmetrically in accordance with the invention three coils in juxtaposed relation in the presence of two N–S magnet poles (FIGURES 18 to 23*b*), a remarkable result is achieved in that, in the case of both alternations of the balance wheel, there are always two sides of the drive coils which play a part in the torque; this is shown in the diagram of FIGURE 21, as will be explained hereinafter. The receiving coil $B_i$ is central and adjacent to the coils $B_{m1}$ and $B_{m2}$; the directions of flow of current through said coils are the same for a single observer, this condition being imperative.

The three coils can be placed side by side, as shown in FIGURE 22, and have a triangular configuration. Alternatively, said coils can be placed one above the other, as shown in FIGURE 19. In the case last mentioned, said coils can be of circular configuration. The two drive coils could also be located in a different plane which is parallel to that of the receiving coil, provided that the adjacent sides are located on a same axis $y_1$–$y_2$ (FIGURE 23*a* as shown in perspective and FIGURE 23*b* as shown in cross-section).

FIGURE 20*a* represents a clockwork mechanism comprising three coils in a same plane with a magnet $\Delta_0$ having two poles on a single circular face with lateral-axial magnetization, as explained in reference to FIGURES 7*a* and 7*b*.

In FIGURE 23*a*, the magnet $\Delta_0$ is of the axial magnetization type with two poles on both faces as explained in reference to FIGURES 14–15.

In these three-coil assemblies which are placed in juxtaposed relation, the induced coil is separate and can accordingly be given a double thickness for the same air gap compared with the thickness which it would have had if it were interlaced with a drive coil as in conventional systems, with the result that a high electromotive force can be obtained for the purpose of saturating the transistor.

In FIGURE 22, the two magnets $\delta_1$–$\delta_2$ are mobile whilst the FIGURES 24*a* and 27 represent the same arrangement with moving coils and stationary coils.

The torques as a function of time or displacements $\alpha$ are shown in FIGURE 21 in the case of an alternation I and reverse alternation II.

In the case of a left-to-right alternation I, for example, there is obtained a driving torque C astride the equilibrium axis $\theta_0$ of the balance wheel; and in the case of the reverse alternation II, two torques having the same amplitude are obtained on each side of $\theta_0$.

In the mode of execution which comprises driving and induced coils disposed side by side (as shown in FIGURES 18 and following), it is possible to increase the diameter of the wire of windings $B_{m1}$–$B_{m2}$ in order to retain the same thickness as the double winding $B_m$–$B_i$ of the preceding figures, the total resistance of the two coils $B_{m1}$–$B_{m2}$ being made equal to that of the drive coil $B_m$ of a winding which is formed of a drive coil $B_m$ and receiving coil $B_i$ which are interlaced in the conventional manner.

The work being proportional to the surface areas of the notches, there is obtained by means of the conventional arrangement of the two coils (as shown in FIGURE 17) and in the case of one alternation, a driving work T and, in the case of the reverse alternation, $T+T$, namely 2T in respect of one period.

In the three-coil arrangement of FIGURES 18 and following, there are obtained in the case of a same ohmic resistance drive coils T and 2T, namely 3T in respect of one period, that is to say an efficiency which is 1.5 times greater.

Figure 29:
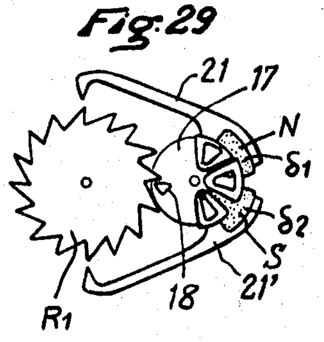

Since the power supplied to the balance wheel in the case of alternation II (FIGURE 21) is double the power developed in respect of alternation I, said alternation II will accordingly be chosen for the step-by-step progression of the timing mechanism by means of an intermittent coupling mode which is shown in FIGURES 28*a* and 29. In these figures, which are given without any implied limitation, the components are positioned so as to ensure that the driving effort is symmetrical on each side of the equilibrium position $\theta_0$. Consequently, isochronism is not impaired either by the "positive" driving torques or by the "negative" resistive torques, and symmetry of amplitudes is complied with.

FIGURE 25 shows a balance wheel which is constructed in accordance with FIGURES 20*a*–20*b*–20*c* but in which the pivotal axis is no longer located outside the magnetized body $\Delta_0$ but passes through the periphery thereof. This alternative form of construction makes it possible to house the mechanism in a casing which has a very small diameter.

FIGURE 26 is a modification in which two discs of ferrite $\Delta_0$–$\Delta_0'$ are employed, each disc being of the lateral-axial magnetization type, thereby producing an intensified two-pole flux within the air gap.

In the case of watches which have a very small flat casing, it may prove an advantage to make use of moving coils in the presence of stationary magnets.

In order to avoid too large a number of flexible connections with the moving system, use will accordingly be made of a very small transistor T which is movable with the balance wheel (as shown in FIGURE 24*a*), thereby reducing to two the number of coil springs ($e_1$–$e_2$) which couple the balance wheel to the dry cell.

The diagram of FIGURE 24*a* shows the connections and junctions of the different elements to the stationary dry cell P, the pivot pin $\psi$ being encased in an insulating tube 16 of very small diameter, said tube being in turn surrounded by a conductive ring which is connected to the centre of the coil spring $e_1$, the second coil spring $e_2$ being connected electrically to the pivot pin. The stationary magnetic frame which serves to close the flux of the two magnets $\delta_1$–$\delta_2$ is constituted, as has been described earlier in reference to FIGURE 24*b* (which is a plan view) and FIGURE 24*c* (which is a view in cross-section taken through the axis). All the elements of said frame are obtained by profile-cutting from a single piece in a permeable sheet.

FIGURE 27 shows in detail the arrangement of two concentric coil springs in a same plane when the thickness of casing does not permit the use of two tiered coil springs.

When it is desired to have a single coil spring, use is made either of a sliding contact which provides adherence by magnetic attraction or an intermittent contact.

In the case of this balance wheel structure which comprises moving and stationary magnets, provision is made as shown in FIGURE 29 for the use of two stationary magnets $\delta_1$–$\delta_2$ of the axial magnetization type for the purpose of driving the windings by means of their upper N–S poles whilst the lower N–S poles polarise profiled armatures of permeable sheeting 21–21' which adhere to these inactive poles. The magnetic circuit of the two magnets is thus closed on the one hand (inactive poles) by the escapement wheel $R_1$ (formed of magnetic metal) at the bottom portion thereof and, on the other hand, by the plate 1*b* as shown in FIGURE 24*c* (active poles), the two magnets being intended to generate the driving torques and to position the escapement wheel $R_1$.

It will be noted that, in the case of this arrangement which comprises moving coils, only one of the two coil springs $e_1$ and $e_2$ (as shown in FIGURE 27) is necessary for the purpose of producing the mechanical couple whilst the other coil spring serves only to supply current and can consist of a very thin wire which forms a few loops of glass or quartz with a silvered surface.

FIGURE 28*b* shows a detail of FIGURE 28*a*; the micromagnet $\delta$ which is intended to position the escapement wheel $R_1$ and to arrest this latter in the interval of mechanical impulses is protected by a magnetic sheath 19$_1$ which closes the flux at the periphery of the teeth of the escapement $R_1$ and forms a magnetic screen. This mode of execution relates to the case in which the coils are stationary. In the contrary case shown in FIGURE 29, this precaution is superfluous.

In FIGURES 30–31 and 32 in which use is made of a coercive body which is constituted by a very flat disc $\Delta_0$ having localized poles and surrounded by a ring of sheet metal which forms a protective shield, the axis of rotation $\psi$ passes through the coercive disc $\Delta_0$ at its centre. In consequence, the $\Delta_0$ has the diameter of the balance wheel and does not call for any supporting frame or for any attachment to the pivot pin. The construction which is thus obtained is very simple and economical.

In view of the fact that, on the one hand in the case of axial magnetization and of a very flat disc, the poles of opposite sign on the two circular faces are highly demagnetizing and that, on the other hand, a very flat disc does not lend itself readily to lateral-axial magnetization, the path of the internal magnetization lines has accordingly been lengthened, as shown in FIGURE 30.

In FIGURE 30, the N–S poles of emergence of the flux in air are at the upper surface. Reference 23 designates a consequent pole which is located on a point of the circular periphery. It is necessary to perform the two-pole magnetization successively between N and 23, then between S and 23 in order to prevent the direct closure within the interior between N–S in a short path.

The pole 23 which is covered by the rim 1 of permeable sheeting does not produce any action in the case of the driving motion. References $\omega_{m1}$ and $\omega_{m2}$ in FIGURE 30 designate two thin plates or copper deposits which are intended to adhere to the two circular faces and the functions of which will be explained hereunder.

In FIGURE 32 the pole surfaces which have the smallest area are located opposite to the windings whilst the opposite face is adherent to a thin plate of permeable sheeting and does not have the function of producing sustaining forces.

In FIGURE 31, there is shown a disc $\Delta_0$ of relatively substantial thickness and having a multipole distribution on one face in lateral-axial magnetization $\varphi'$ and an axial single-pole distribution $\varphi$ on the other face. The multipole face is placed opposite to a number of drive coils whilst the other face determines in the presence of a single receiving coil only one triggering signal at each transition through the equilibrium position, thereby permitting of correct electronic operation irrespective of the number of drive poles.

In order to suppress the reaction between input and output circuits of a triode which give rise to spurious oscillations, use is usually made of a decoupling capacitor C, as shown in FIGURE 22.

Figure 33:
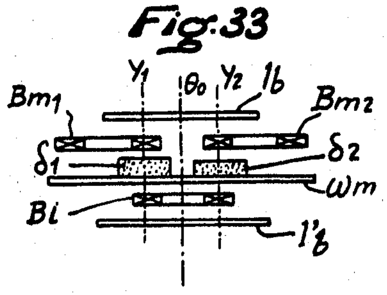

In order to reduce the overall size of the mechanism, it is an advantage to replace said decoupling capacitor by a thin nonmagnetic disc having high conductivity (of copper or aluminium, for example), said disc being placed between the drive winding and induced winding. This electrodynamic screen supresses all spurious high-frequency oscillations without giving rise to any braking of the balance wheel if the screen is movable together with the magnets for which it serves as a convenient support. The moving electrodynamic screen $\omega_m$ is then in solid metal, as shown in FIGURE 33.

In the case of a balance wheel which is formed of a ferrite disc with localized poles as has been explained earlier, the copper plate $\omega_m$ (which is shown in FIGURE 30 with portions broken away) is adherent to one or both of the circular faces of $\Delta_0$.

In the event that the electrodynamic screen is stationary ($\omega_F$ in FIGURES 34 and 35) in the presence of a moving magnetic flux, said screen is accordingly made up of a series of conductive spirals which are concentric with respect to the pivotal axis of the magnets and which are, for example, printed on a thin insulating card. A screen of this type serves to supress spurious oscillations in much the same way as if it were solid. However, there cannot in that case be established in this screen and beneath the poles of the moving magnets induced poles which are capable of braking the magnets by reason of the fact that the eddy currents can close only from one turn to the next.

Figure 35:
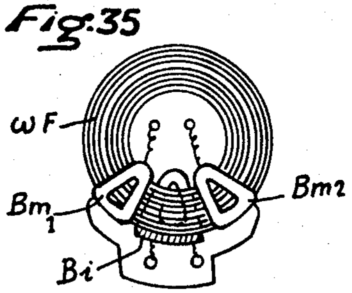
Figure 34:
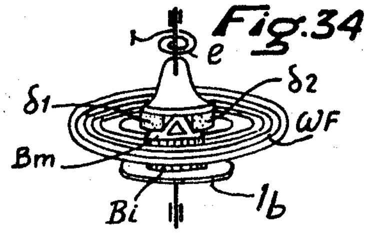

FIGURE 34 corresponds to the case of two coils and FIGURE 35 corresponds to the case of three coils in juxtaposed relation, wherein the sector of the screen which corresponds to the central coil has the shape of a notch, the depth of which is equal to the thickness of the coil.

What is claimed is:

1. A clockwork mechanism including a balance wheel having a pivoting axis; a magnetic sheet frame and at least one coercive premagnetized body mounted in said frame; at least one induced winding magnetically coupled to the balance wheel through an air gap, so that any relative angular displacement of the balance wheel and induced winding will induce an electromotive force in the said winding each time the balance wheel passes through a position of equilibrium; at least one drive winding coupled to the balance wheel through the said air gap; a power supply circuit for the drive winding, said supply circuit including a direct-current source and being normally cut-off conductive and a transistor controlled by the said electromotive force so as to close the said supply circuit, wherein the said frame consists of a single profile-cut magnetic sheet having a first part which is folded back so as to include portions which are respectively perpendicular and parallel to the pivoting axis and are bordering the said air gap, said magnetic sheet having a second part which is folded back and cambered so as to form a protective shielding clip, the said coercive body being removably held fast in the said clip.

2. A clockwork mechanism as claimed in claim 1, wherein that portion of the said first part of the profile-cut magnetic sheet which is perpendicular to the pivoting axis includes a circular plate which adheres to the said premagnetized body, the said second part of the profile-cut magnetic sheet including a ring portion having a dimension, as measured in a direction parallel to the said axis, which substantially equals the dimensions of the said premagnetized body, as measured from one pole to the other pole thereof.

3. A clockwork mechanism as claimed in claim 2, wherein that portion of the said first part of the profile-cut magnetic sheet which is perpendicular to the pivoting axis includes a further plate which is substantially smaller than said circular plate, the said second part further including an elbowed portion which connects the said further plate, the said circular plate and the said ring portion together.

4. A clockwork mechanism as claimed in claim 3, wherein the pivoting axis passes through the said circular plate and is secured thereto in a point which is located at the periphery of said plate, in close proximity of the said elbowed portion, said windings and said transistor being mounted stationary.

5. A clockwork mechanism as claimed in claim 1, wherein said premagnetized body comprises at least a ferrite block having polar regions localized within the mass thereof, that portion of the said first part of the profile-cut magnetic sheet which is perpendicular to the pivoting axis essentially consisting of a plate whereas that portion of the said first part which is parallel to the pivoting axis essentially consists of an elbowed portion, the said second part essentially consisting of two wing portions concentric with the pivoting axis, the said elbowed portion connecting the said wing portions to the said plate.

6. A clockwork mechanism as claimed in claim 5, wherein the said pivoting axis passes through the said frame at two points which are located in close proximity of the said elbowed portion.

7. A clockwork mechanism as claimed in claim 5, wherein the said ferrite block is disc-shaped and laterally axially magnetized with two polar regions, north and south respectively, located on one of the faces thereof, and a neutral region separating the two polar regions.

8. A clockwork mechanism as claimed in claim 1, wherein the said premagnetized body includes an axially magnetized ferrite block having two faces perpendicular to the pivoting axis and two pairs of south and north poles on the two respective faces, the said first part of the profile-cut magnetic sheet including first and second plates perpendicular to the pivoting axis and a portion parallel to the pivoting axis, said parallel portion having a central region and connecting the said plates together, the said second part of the profile-cut magnetic sheet comprising two wings which are connected to the said central region and form a substantially circular elastic shielding in which the ferrite block is maintained, the pivoting axis passing through the two plates in close proximity of the parallel portion, the induced and drive windings being respectively located in the respective intervals between the first and second plates and the second part.

9. A clockwork mechanism as claimed in claim 1, said mechanism comprising first, second and third identical flat windings, the second winding being in an intermediate position between the first and third windings and being an induced winding, the first and third windings being drive windings and being serially connected in the said circuit and coupled to the respective north and south poles of the premagnetized body in such a manner that the current from the said direct-current source flows in the same direction in both the first and third windings; the first, second and third windings being so arranged that the facing sides of the second winding respectively project substantially upon two sides of the first and third windings in a direction parallel to the pivoting axis.

10. A clockwork mechanism as claimed in claim 1, wherein the said windings and the said transistor are pivotally mounted about the said pivoting axis, the magnetic frame being stationary, said transistor having a base, an emitter which is connected to the pivoting axis and a collector which is connected to the drive winding, a coil spring, which is electrically isolated from the pivoting axis, connecting the said collector to the said direct-current source, the induced winding being connected to the said base and to the pivoting axis.

11. A clockwork mechanism as claimed in claim 1, said mechanism including timing gear wheels; means for driving said timing gear wheels step-by-step, said means essentially consisting of a ratchet-toothed escapement wheel and of magnetic yokes, said yokes being mounted integrally with the said premagnetized body, and means for positioning the said escapement wheel through magnetic attraction.

12. A clockwork mechanism as claimed in claim 1, wherein the said premagnetized body essentially consists of a ferrite disc with localized poles, the pivoting axis passing through the said disc at the center thereof, the internal magnetic lines of flux between the localized poles on at least one face of said disc having a dimension substantially larger than the thickness of said disc.

13. A clockwork mechanism as claimed in claim 1, wherein the said premagnetized body essentially consists of a ferrite disc with localized poles, the magnetic lines of flux emerging on the respective faces of the disc within polar surfaces which have substantially different areas.

14. A clockwork mechanism as claimed in claim 1, said mechanism including a nonmagnetic conductive screen interposed between the induced and drive windings.

References Cited

FOREIGN PATENTS

| | | |
|---|---|---|
| 560,509 | 8/1955 | Italy. |
| 1,447,917 | 7/1966 | France. |

RICHARD B. WILKINSON, Primary Examiner

EDITH C. SIMMONS, Assistant Examiner